US010505617B2

(12) United States Patent
Kazmi et al.

(10) Patent No.: US 10,505,617 B2
(45) Date of Patent: Dec. 10, 2019

(54) FIRST AND SECOND RADIO NODES AND METHODS THEREIN, FOR PERFORMING A RADIO COMMUNICATION

(71) Applicant: Telefonaktiebolaget LM Ericsson (publ), Stockholm (SE)

(72) Inventors: Muhammad Kazmi, Sundbyberg (SE); Sara Landström, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/768,594

(22) PCT Filed: Oct. 18, 2016

(86) PCT No.: PCT/SE2016/051010
§ 371 (c)(1),
(2) Date: Apr. 16, 2018

(87) PCT Pub. No.: WO2017/074243
PCT Pub. Date: May 4, 2017

(65) Prior Publication Data
US 2018/0302144 A1     Oct. 18, 2018

Related U.S. Application Data

(60) Provisional application No. 62/247,765, filed on Oct. 29, 2015.

(51) Int. Cl.
*H04B 7/06* (2006.01)
*H04L 1/00* (2006.01)
(Continued)

(52) U.S. Cl.
CPC .......... *H04B 7/0689* (2013.01); *H04B 7/02* (2013.01); *H04B 7/06* (2013.01); *H04L 1/0018* (2013.01);
(Continued)

(58) Field of Classification Search
CPC .......... H04B 7/0689; H04B 7/02; H04B 7/06; H04L 1/0018; H04L 1/0023;
(Continued)

(56) References Cited

U.S. PATENT DOCUMENTS

2005/0096062 A1* 5/2005 Ji .......................... H04W 16/02
455/450
2005/0193307 A1* 9/2005 Wengerter ............ H04L 1/0003
714/749
(Continued)

FOREIGN PATENT DOCUMENTS

EP     2254262 A2   11/2010
EP     2399416 A1   12/2011
(Continued)

OTHER PUBLICATIONS

Analog Devices, "A Beginner's Guide to Digital Signal Processing", Jun. 2015, pp. 1-2.*
(Continued)

*Primary Examiner* — Sophia Vlahos
(74) *Attorney, Agent, or Firm* — Coats & Bennett, PLLC

(57) ABSTRACT

A first radio node (200), a second radio node (202) and methods therein, for transmitting and receiving a data block in a radio network. The first radio node (200) selects (2:1) at least one of: 1) time diversity mode, 2) frequency diversity mode, and 3) spatial diversity mode, based on a first comparison between an estimated signal quality of each diversity mode and a quality threshold, and/or a second comparison between an estimated round trip time of each diversity mode and a round trip time threshold. The first radio node (200) further performs (2:2) a first transmission of the data block, and the second radio node (202) identifies (2:3) the diversity mode(s) selected by the first radio node (200). The first radio node (200) then performs (308) a second transmission of the data block according to the selected diversity mode(s) so
(Continued)

that the second radio node (202) can decode (2:5) the data block by combining the first and second transmissions of the data block.

18 Claims, 6 Drawing Sheets

(51) Int. Cl.
| | | |
|---|---|---|
| *H04B 7/02* | (2018.01) | |
| *H04L 1/02* | (2006.01) | |
| *H04W 52/42* | (2009.01) | |
| *H04L 1/08* | (2006.01) | |
| *H04L 1/04* | (2006.01) | |
| *H04L 1/06* | (2006.01) | |
| *H04L 1/20* | (2006.01) | |
| *H04W 28/06* | (2009.01) | |
| *H04L 1/18* | (2006.01) | |
| *H04W 4/70* | (2018.01) | |

(52) U.S. Cl.
CPC .......... *H04L 1/0023* (2013.01); *H04L 1/0025* (2013.01); *H04L 1/02* (2013.01); *H04L 1/04* (2013.01); *H04L 1/06* (2013.01); *H04L 1/0606* (2013.01); *H04L 1/0643* (2013.01); *H04L 1/08* (2013.01); *H04L 1/1825* (2013.01); *H04L 1/208* (2013.01); *H04W 28/065* (2013.01); *H04W 52/42* (2013.01); *H04L 1/1887* (2013.01); *H04W 4/70* (2018.02)

(58) Field of Classification Search
CPC . H04L 1/0025; H04L 1/02; H04L 1/06; H04L 1/0606; H04L 1/0643; H04L 1/08; H04L 1/208; H04L 1/04; H04L 1/1887; H04L 1/1825; H04W 28/065; H04W 52/42; H04W 4/70

See application file for complete search history.

(56) References Cited

U.S. PATENT DOCUMENTS

| | | | | |
|---|---|---|---|---|
| 2006/0083195 | A1* | 4/2006 | Forenza | H04B 7/0689 370/328 |
| 2006/0203924 | A1* | 9/2006 | Casaccia | H04L 1/0045 375/260 |
| 2006/0233280 | A1 | 10/2006 | Tynderfeldt et al. | |
| 2007/0147414 | A1* | 6/2007 | Niu | H04B 7/0689 370/465 |
| 2007/0153928 | A1* | 7/2007 | Liu | H04L 1/1671 375/260 |
| 2008/0240208 | A1* | 10/2008 | Lou | H04B 7/0671 375/211 |
| 2011/0206030 | A1* | 8/2011 | Hoshino | H04B 7/0671 370/342 |
| 2013/0094439 | A1 | 4/2013 | Moshfeghi | |

FOREIGN PATENT DOCUMENTS

| | | |
|---|---|---|
| WO | 00111806 A1 | 3/2000 |
| WO | 2010095992 A1 | 8/2010 |

OTHER PUBLICATIONS

Parthasarathy, A. et al., "Three Dimensional Diversity for Closed Proximity MIMO Systems", IEEE Aerospace Conference, Mar. 7, 2015, pp. 1-7, IEEE.

Lee S-B. et al., "Exploiting Spatial, Frequency, and Multiuser Diversity in 3GPP LTE Cellular Networks", IEEE Transactions on Mobile Computing, vol. 11, No. 11, Nov. 1, 2012, pp. 1652-1665, IEEE.

* cited by examiner

FIRST AND SECOND RADIO NODES AND METHODS THEREIN, FOR PERFORMING A RADIO COMMUNICATION

TECHNICAL FIELD

The present disclosure relates generally to a first radio node, a second radio node and methods therein, for performing a radio communication between the first radio node and the second radio node in a radio network. The radio communication comprises transmitting a data block from the first radio node to the second radio node.

BACKGROUND

For some years, different types of radio networks for wireless communication have been developed to provide radio access for various wireless devices. The radio networks are constantly improved to provide better coverage and capacity and to meet the demands from subscribers using increasingly advanced services and equipment, e.g. smartphones and tablets, which may require considerable amounts of bandwidth and resources for data transport in the networks. A limiting factor for capacity of a radio network is the amount of available radio resources, e.g. in terms of time, frequency bandwidth and transmit power, and the capacity of a radio network is improved by more efficient usage of such radio resources.

In this disclosure, the term "wireless device" is used to represent any communication entity capable of radio communication with a radio network by sending and receiving radio signals, such as e.g. mobile telephones, tablets, laptop computers and Machine-to-Machine, M2M, devices, also known as Machine Type Communication, MTC, devices, Laptop Embedded Equipped, LEE, Laptop Mounted Equipment, LME, USB dongles, Customer Premises Equipment, CPE, etc. An MTC device may also be referred to as a low complexity and/or low cost UE. The term MTC device will be used herein for consistency although it could be replaced by M2M device throughout this disclosure. Another common generic term in this field is "User Equipment, UE" which is frequently used herein as a synonym for wireless device. Further, the term "network node", is used herein to represent any node of a radio network that is operative to communicate radio signals with wireless devices, or to control some network entity having radio equipment for receiving/transmitting the radio signals.

The network node in this disclosure could also be referred to as a base station, radio node, e-NodeB, eNB, NB, base transceiver station, access point, relay node, Remote Radio Unit (RU, Remote Radio Head, RRH, etc., depending on the type of network and terminology used. Both terms network node and base station are used interchangeably in this disclosure.

Further, the term "radio node" is used herein to represent any of a network node and a wireless device. Thus, when it is said that a first radio node transmits data to a second radio node, this could be valid for downlink transmission when a network node in a wireless network transmits data to a wireless device, and for uplink transmission when a wireless device transmits data to a network node, and also for Device-to-Device, D2D, transmission when a wireless device transmits data to another wireless device. In this description, it is further said that the data is transmitted as a "data block" although the description is not limited to any particular format or technology used for realizing the data block.

It is becoming increasingly common to employ MTC devices at certain locations to operate automatically by sending data and receiving control signals according to some predefined behavior. Such MTC devices may be configured to measure and report some metric or parameter of interest, such as temperature, pressure, voltage, battery level, light, motion, sound, distance to objects, etc., and to operate in some process in response to some control signals received from a controlling node, to mention a few illustrative examples. An MTC device may further be installed at a fixed location or on a moving structure such as a vehicle. Especially in the latter case, the radio conditions may change rapidly for the MTC device.

The MTC devices may be wirelessly connected to a serving network node of a radio network to report data comprising information about their measurements and observations to the controlling node. The controlling node may further send various commands and instructions back to the MTC devices to control their operation.

An example of an arrangement with multiple MTC devices is schematically illustrated in FIG. 1 where the MTC devices "D" are operatively installed at different locations in an area 100, the MTC devices D being configured to send reports "R" over a radio network 102 to a controlling node 104. The controlling node 104 may also send various commands "C" to different MTC devices D.

As mentioned above, it is of interest for network operators to improve capacity in their networks by utilizing the available radio resources as efficiently as possible. It may also be of interest to ensure reliability when data is transmitted to or from the wireless devices, e.g. MTC devices, to avoid that too much errors occur in the information communicated, if required. It may also be of interest to ensure low latency when data is transmitted to or from the wireless devices, e.g. MTC devices, if required.

If a data receiving node detects that data has not been received correctly from a data sending node, the data receiving node may according to conventional procedures send a feedback message effectively indicating an error, back to the data sending node which then may retransmit the same data to the data receiving node. The retransmission may be repeated, e.g. until the data has been received correctly which is confirmed by another feedback message from the data receiving node indicating correct reception. However, such feedback signaling adds delay to the communication which may not be acceptable, e.g. when the data rapidly becomes out of date and therefore useless at the data receiving node. It may thus happen that the data is not successfully received and decoded in time and cannot therefore be used, in spite of one or more retransmissions which have in this case been performed to no avail while still consuming radio resources. The feedback signaling also consumes additional radio resources and may further generate additional interference in the network.

MTC communication is thus used for establishing communication between machines and between machines and humans. The communication may involve exchange of data, signaling, measurement data, configuration information, etc. The MTC devices are quite often used for applications such as sensing environmental conditions (e.g. temperature reading), metering or measurement of various parameters (e.g. electricity usage), fault finding or error detection, etc. There are several MTC use cases that can be classified into two broader groups depending on their requirements, referred to as "massive MTC" and "critical MTC" or C-MTC for short. For massive MTC, low cost and enhanced coverage are desirable aspects while latency and reliability are typically more significant aspects for the critical MTC.

Cost reduction can be realized by relaxing the requirements on peak rate and receiver performance in a network where Long Term Evolution, LTE, is employed. LTE Release 12 introduces a low cost UE category called UE category 0 with a relatively low peak rate of 1 Megabits per second, Mbps, and relaxed performance requirements that can be fulfilled having just a single antenna receiver in the UE. The cost can be further reduced by supporting only half duplex FDD (Frequency Division Duplex) capability instead of full duplex FDD capability. The latter feature avoids the need for having duplex filter since the UE never transmits and receives at the same time in half duplex FDD. The cost can further be lowered by reducing the current RF (Radio Frequency) bandwidth for LTE UEs from 20 MHz to 1.4 MHz or even to 200 KHz.

MTC devices for LTE are sometimes required to support enhanced UL (Uplink) and/or DL (Downlink) coverage. The enhanced coverage may also be interchangeably called extended coverage. These devices are installed at locations where path loss between the MTC device and the base station can be very large such as when the MTC device is used as a sensor or metering device located in a remote area such as a basement of a building. In such scenarios correct reception of signals from the base station may be quite difficult to achieve. For example, the path loss can be greater than 15-20 dB compared to normal operation. In order to overcome such difficulties, it would be helpful to substantially enhance the coverage in uplink and/or in downlink. This can be realized by employing one or more techniques in the UE and/or in the radio network node for enhancing the coverage, e.g. by boosting of DL transmit power, boosting of UL transmit power, enhanced UE receiver, signal repetition, etc.

For critical MTC, other requirements such as latency and/or reliability are typically of importance. The latency requirements may be in the order of 1-10 ms end-to-end at the same time as the reliability requirements, e.g. defined as guaranteed packet delivery within a given time limit, can be as stringent as a packet delivery error rate not exceeding $10^{-9}$. In many use cases, a mix of applications sharing the same air interface such as in a factory can be envisioned with some applications having stringent requirements and other applications having more relaxed requirements.

Today's wireless interfaces typically operate at $10^{-1}$ reliability and delays in the order of tens of milliseconds, ms. Techniques that may be used to achieve this reliability include an appropriate choice of modulation and coding scheme to match the signal quality (link adaptation) and power control. Also, a feedback loop may be employed where a negative acknowledgement, NACK, or the absence of an acknowledgement within a given time indicates the need for a retransmission which is then scheduled later in time.

It may thus be a problem that the above-mentioned requirements for low latency and high reliability, e.g. in critical MTC, may not be met when transmitting data blocks to a receiving radio node, in either uplink or downlink. In that case, the transmitted data blocks may be more or less useless for the receiving radio node which naturally may affect the operation of the receiving radio node negatively. Furthermore, precious radio resources have thereby been wasted to no avail, and interference may also have been generated by such pointless transmission which could potentially be harmful to other transmissions in the radio network and the overall capacity in the network.

SUMMARY

It is an object of embodiments described herein to address at least some of the problems and issues outlined above. It is possible to achieve this object and others by using a first radio node, a second radio node and methods therein, as defined in the attached independent claims.

According to one aspect, a method is performed by a first radio node for transmitting a data block to a second radio node in a radio network. In this method, the first radio node selects at least one diversity mode out of:

1) time diversity mode comprising transmitting the data block in multiple time intervals,
2) frequency diversity mode comprising transmitting the data block on multiple frequencies, and
3) spatial diversity mode comprising transmitting the data block from multiple locations, based on at least one of a first comparison between an estimated signal quality of each diversity mode and a quality threshold, and a second comparison between an estimated round trip time of each diversity mode and a round trip time threshold. The estimated round trip time indicates the time required to successfully transmit a data block from the first radio node to the second radio node.

The first radio node then performs a first transmission of the data block to the second radio node, and further performs at least a second transmission of said data block to the second radio node according to the selected at least one diversity mode. Thereby, it is an advantage that a suitable, or "the best", diversity mode can be autonomously selected to match traffic requirements and channel conditions, such that it is not necessary to rely on feedback signaling which may not be possible when short latency is required or when there are no radio resources available for feedback signaling.

According to another aspect, a first radio node is arranged to transmit a data block to a second radio node in a radio network. The first radio node is configured to select at least one diversity mode out of:

1) time diversity mode comprising transmitting the data block in multiple time intervals,
2) frequency diversity mode comprising transmitting the data block on multiple frequencies, and
3) spatial diversity mode comprising transmitting the data block from multiple locations, based on at least one of a first comparison between an estimated signal quality of each diversity mode and a quality threshold, and a second comparison between an estimated round trip time of each diversity mode and a round trip time threshold. This functionality may be realized by means of a selecting module in the first radio node.

The first radio node is also configured to perform a first transmission of the data block to the second radio node, and to perform at least a second transmission of said data block to the second radio node according to the selected at least one diversity mode. These functionalities may be realized by means of a performing module in the first radio node.

According to another aspect, a method is performed by a second radio node for receiving a data block transmitted by a first radio node in a radio network. In this method, the second radio node receives a first transmission of the data block from the first radio node. The second radio node then identifies at least one diversity mode to be used by the first radio node, out of:

1) time diversity mode comprising receiving the data block in multiple time intervals,
2) frequency diversity mode comprising receiving the data block on multiple frequencies, and 3) spatial diversity mode comprising receiving the data block from multiple locations.

The second radio node further receives at least a second transmission of said data block from the first radio node according to the at least one diversity mode, and the second radio node then decodes the data block by combining the received first and second transmissions of the data block.

According to another aspect, a second radio node is arranged to receive a data block transmitted by a first radio node in a radio network. The second radio node is configured to receive a first transmission of the data block from the first radio node, which functionality may be realized by means of a receiving module in the second radio node. The second radio node is also configured to identify at least one diversity mode, to be used by the first radio node, out of:
1) time diversity mode comprising receiving the data block in multiple time intervals,
2) frequency diversity mode comprising receiving the data block on multiple frequencies, and
3) spatial diversity mode comprising receiving the data block from multiple locations.

This functionality may be realized by means of an identifying module in the second radio node. The second radio node is also configured to receive at least a second transmission of said data block from the first radio node according to the at least one diversity mode, which functionality may be realized by means of the receiving module in the second radio node. The second radio node is also configured to decode the data block by combining the received first and second transmissions of the data block, which functionality may be realized by means of a decoding module in the second radio node.

The above methods and network nodes may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
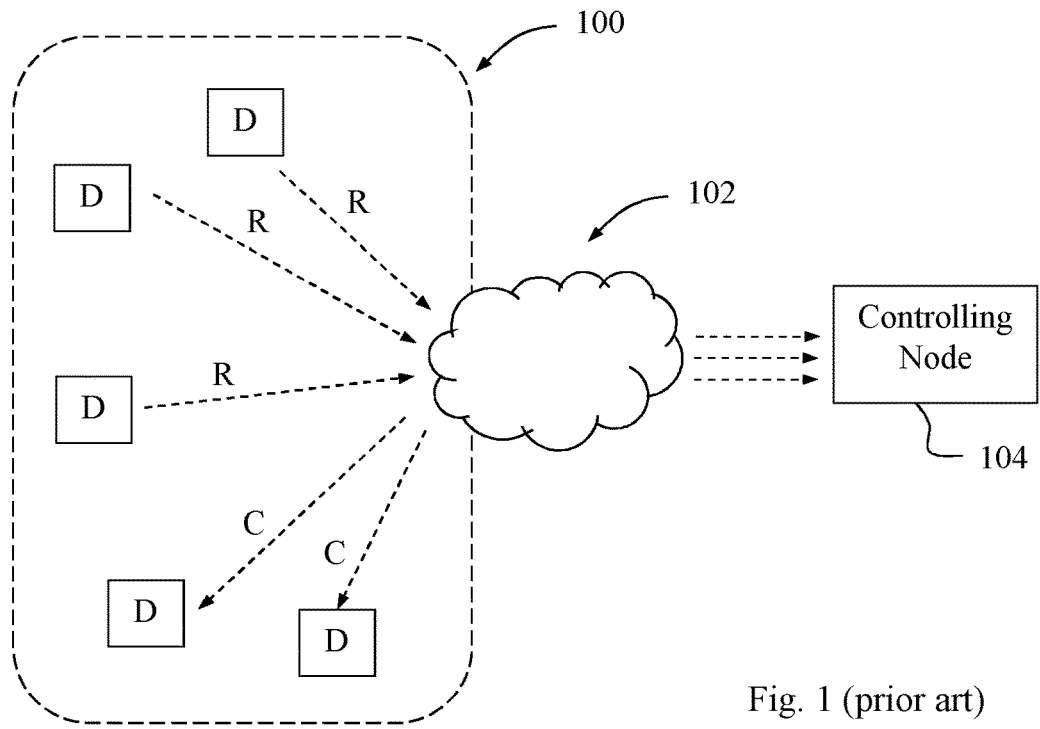
FIG. 1 is a communication scenario illustrating usage of MTC devices, according to the prior art.

Requirements for critical MTC, also known as "mission critical MTC", "MTC for critical scenarios", etc., are typically very stringent, e.g. including requirements for at least one of:

Very short end-to-end delay or round trip delay, e.g. in the range of 1-10 ms; and Very high reliability of data transmission, e.g. in terms of Packet delivery Error Rate (PER) or Block Error Rate (BLER) or Frame Error Rate (FER), as experienced at the receiving node, and the PER, BLER of FER should not exceed $10^{-9}$ (i.e. $10^{-7}\%$).

The above requirements imply another operating issue than what today's solutions are designed for, such as very short round trip delay and very high reliability. Hence, due to very low latency requirement, to use an error receiver mechanism based on feedback from the receiver may not be possible or feasible. Furthermore, to ensure robust operation with $10^{-9}$ reliability it would be very costly to design sufficiently robust data and control channels.

The mission critical MTC devices may also operate in a wide range of different radio and operating environments, e.g. under high temperature, low speed but high delay spread, etc. Regardless of the environment, stringent requirements will have to be met. Therefore the current transmission mechanisms used by existing MTC devices are not suitable for operation of mission critical MTC.

Mode selection for transmission of data blocks by means of multi-carrier operation is described in EP2399416 A1 where one of the following 4 different strategies for transmitting data blocks is selected: 1) different data blocks are sent on different component carriers, 2) the same data block is split and different parts of the data block are sent on different component carriers, 3) the same data block is sent on different component carriers, and 4) the same data block is repeated on different component carriers in different Transmission Time Intervals, TTIs.

However, EP2399416 A1 does not describe selection between modes where at least one mode would involve spatial diversity. Under deep fade or shadow in a radio environment characterized by low speed or static environment and with large coherence bandwidth, data transmissions over different carriers and/or in different time intervals, commonly called TTIs, alone will not be sufficient to achieve the very high data reception quality as envisaged for critical MTC i.e. achieving negligible decoding error/failure. Another major difference is that the criteria used for the mode selection in EP2399416 A1 are not suitable for applications like critical MTC where high reliability and short delay must be achieved.

Embodiments herein may involve three main examples as follows:

In a first main example, a first radio node (e.g. base station):
transmits a first or initial data block to the second radio node (e.g. UE);
further selects one of three Basic Retransmission Modes, BRMs, which are denoted BRM1-3 herein, based on one or more criteria, and
Autonomously retransmits at least a second data block to the second radio node using the selected basic retransmission mode BRM, where the second data block is a partial or identical copy of the first data block.

In a second main example a first radio node (e.g. base station):
transmits a first or initial data block to the second radio node (e.g. UE);
further selects one of four Composite Retransmission Modes, CRMs, which are denoted CRM1-4 herein, based on one or more criteria, wherein each CRM mode is combination of at least two of the above BRM modes, and
Autonomously retransmits at least a second data block to the second radio node using the selected composite retransmission mode CRM, where the second data block is a partial or identical copy of the first data block.

It should be noted that in this description, the term "retransmit" denotes at least one second transmission of the data block in addition to a first transmission of the same data block. The second transmission may be performed after and/or at the same time as the first transmission, depending on the used mode. It should also be noted that the term "retransmission mode" is used herein as a synonym for "diversity mode" which defines how a first transmission and at least one second transmission of the data block are performed to achieve transmit diversity, thus according to any of the alternatives BRM1-BRM3 and CRM1-CRM4 described in this disclosure. Further, the term "composite retransmission mode" CRM denotes a combination of two or three basic (re)transmission modes BRMs.

In a third main example a first radio node (e.g. base station):
  determines based on one or more criteria whether to use BRM or CRM modes for retransmitting a first data block;
  transmits a first or initial data block to the second radio node (e.g. UE);
  selects one of the modes of the determined BRM or CRM set of modes based on one or more criteria, and
  autonomously retransmits at least a second data block to the second radio node using the selected retransmission mode BRM or CRM, where the second data block is a partial or identical copy of the first data block.

In any of the above three main examples, a second radio node (e.g. UE):
  receives a first data block from a first radio node;
  determines, based on one or more of an autonomous detection, pre-defined rules and an indication received from the first radio node, one of the BRM or CRM modes to be used for receiving one or more partial or identical copies of the first data block;
  receives one or more retransmitted copies of the first data block using the determined mode, and
  combines the received data blocks associated with the same first data block for decoding the data block.

The embodiments and examples herein are described by considering LTE. However the embodiments and examples herein are applicable to any Radio Access technology, RAT, or multi-RAT systems, where the UE receives and/or transmit signals (e.g. data) e.g. LTE FDD/TDD, WCDMA/HSPA, GSM/GERAN, Wi Fi, WLAN, CDMA2000 etc.

Figure 2:
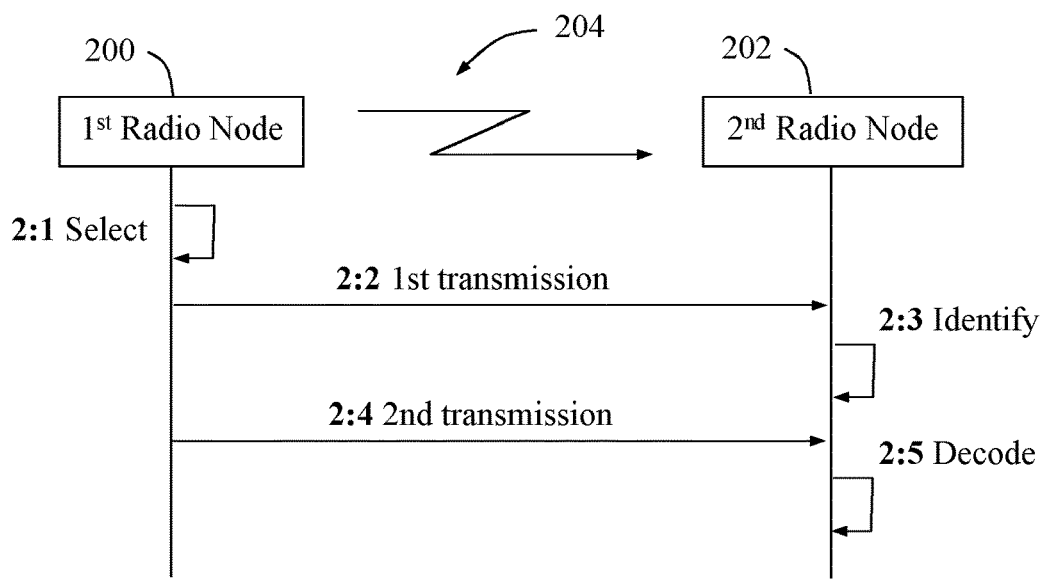
FIG. 2 is a signaling diagram illustrating an example of a communication where the solution may be employed, according to some possible embodiments.

An example of a communication scenario where the solution is employed is illustrated in FIG. 2 and involves at least two radio nodes: a first radio node 200 and a second radio node 202, which communicate with each other over a wireless communication link 204. It is assumed that critical information or information associated with mission critical operation is communicated in this scenario, which may simply be referred to as mission critical information, which may be associated with at least one of the following two basic requirements:
  1. Ultra-low end-to-end delay e.g. 1-10 ms.
  2. Ultra-high reliability e.g. BLER or packet error rate in the order of $10^{-9}$, i.e. $10^{-7}$%.

It is further assumed that the first and the second radio nodes 200, 202 are capable of receiving and/or transmitting such mission critical information for example in a mission critical MTC operational scenario.

The first radio node 200 is at least capable of transmitting radio signals containing mission critical information to the second radio node 202. Therefore the first radio node 200 has at least a transmitting unit and the second radio node 202 has at least a receiving unit. The first radio node 200 may also be capable of receiving various reported information from the second radio node 202, e.g. measurements etc.

Examples of the first and the second radio nodes 200, 202 are:
  radio network node and UE, respectively;
  UE and radio network node, respectively;
  UE and UE, respectively, such as in a D2D scenario also referred to as ProSe direction operation.

The first radio node 200 may be associated with one or more sub first-nodes, to be described below.

The first radio node 200 selects one or more diversity modes to be used for transmitting the data block, in an action 2:1. Some examples of how this may be done will be described later below. The first radio node 200 then transmits an initial or first data block to the second radio node 202 on the radio link 204, in an action 2:2. The first data block is also interchangeably called as the first transmission or the initial transmission. The data block may interchangeably be called as packet, data packet, transport block, frame etc. Hereinafter, for consistency, the term 'data block' is used. The second radio node 202 identifies the one or more diversity modes, in an action 2:3. Some examples of how this may be done will be described later below.

The first radio node 200, and optionally one or more associated sub first-nodes, may further autonomously retransmit one or plurality of partial or identical copies of the first data block, to the second radio node 204, in an action 2:4. The 'partial or identical copies' of the first data block are interchangeably called as the copies of the first data block, subsequent copies, retransmissions, retransmitted data blocks, etc. The autonomous retransmission may be triggered by the first radio node 200 based on one or more criteria but without employing any feedback procedure or request from the second radio node 202, e.g. without receiving any ACK/NACK as feedback message. In case of 'the partial copy', the retransmission in action 2:4 may be encoded in different manner compared with the first transmission in action 2:2. This may enable the second radio node 202 to perform 'soft combining' by means of incremental redundancy (IR). A final action 2:5 illustrates that the second radio node 202 decodes the data block basically by combining the first and second transmissions.

In case of 'the identical copy', the retransmission, i.e. second transmission, may contain the same information (such as an identical copy of the first data block), which enables the second radio node 202 to perform so-called "soft combining" e.g. by means of Chase combining (CC). The IR or CC mechanism for combining data blocks are mentioned here as examples although other combining operations may also be possible. The embodiments and examples herein are thus applicable to any mechanism which can be employed by the second radio node 202 to combine the data block received in the first transmission with the data block received in the one or more second transmissions. For example, the second radio node may even apply 'selection combining' of the first and second transmissions in order to correctly decode the data.

Figure 3:
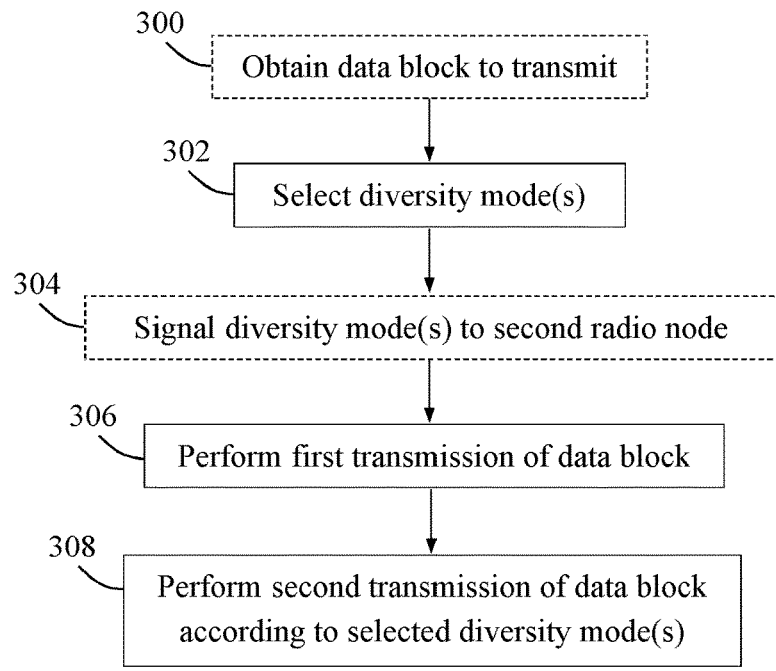
FIG. 3 is a flow chart illustrating a procedure in a first radio node, according to further possible embodiments.

An example of how the solution may be employed will now be described with reference to the flow chart in FIG. 3 and in terms of actions performed by a first radio node such as the above-described first radio node 200. FIG. 3 thus illustrates a procedure in the first radio node for transmitting a data block to a second radio node in a radio network, such as the above-described second radio node 202. Some optional example embodiments that could be used in this procedure will also be described. Reference will also be made, without limiting the described features and embodiments, to the example scenario shown in FIG. 2.

An optional first action 300 illustrates that the first radio node 200 may first obtain the data block, e.g. from a data buffer or the like in the radio node 200, to be transmitted to the second radio node 202. In a next action 302, the first radio node 200 selects at least one diversity mode out of the following diversity modes:
 1) time diversity mode comprising transmitting the data block in multiple time intervals,
 2) frequency diversity mode comprising transmitting the data block on multiple frequencies, and
 3) spatial diversity mode comprising transmitting the data block from multiple locations.

This selection is made based on at least one of a first comparison between an estimated signal quality of each diversity mode and a quality threshold, and a second comparison between an estimated round trip time of each diversity mode and a round trip time threshold. Here, it is assumed that all three diversity modes are available for use in the communication. If any of the diversity modes is not available it can just be disregarded in the selection operation of action 302. For example, the spatial diversity mode may not be available if there is no further radio node at a location suitable for the transmission, or having free resources for transmitting the data block. In that case, it may not be necessary to evaluate the spatial diversity mode.

In action 302, a signal quality may be estimated for each available diversity mode and the estimated signal quality of each diversity mode may then be compared with the quality threshold, according to the above first comparison. The diversity mode that provides the best signal quality compared to the quality threshold, e.g. being above the quality threshold, may then be selected in this action, if high reliability and low error rate are required for the communication.

Alternatively or additionally, a round trip time may be estimated for each available diversity mode and the estimated round trip time of each diversity mode may then be compared with the round trip time threshold, according to the above second comparison. The estimated round trip time indicates the time it would take to successfully transmit a data block from the first radio node to the second radio node. The diversity mode that provides the shortest round trip time compared to the round trip time threshold, e.g. being below the round trip time threshold, may then be selected in this action, if low latency is required for the communication. If both high reliability and low latency are required for the communication, both of the above first and second comparisons may be performed in this action.

The first radio node 200 may further signal the selected at least one diversity mode to the second radio node 202, as illustrated in another optional action 304. The first radio node 200 further performs a first transmission of the data block to the second radio node, as illustrated in action 306. Action 306 may alternatively occur before action 304. Another action 308 illustrates that the first radio node 200 further performs at least a second transmission of said data block to the second radio node 202 according to the selected at least one diversity mode.

Some non-limiting example embodiments that can be used in the above procedure of FIG. 3, will now be described. In some example embodiments, selecting the at least one diversity mode may be performed such that the estimated signal quality of the selected at least one diversity mode is above the quality threshold and/or the estimated round trip time of the selected at least one diversity mode is below the round trip time threshold. Thereby, it is possible to meet requirements of reliability and latency when defined in terms of the quality and round trip time thresholds.

In further example embodiments, selecting the at least one diversity mode may comprise selecting two or three diversity modes such that the estimated signal quality of the selected two or three diversity modes combined is above the quality threshold and/or the estimated round trip time of the selected two or three diversity modes combined is below the round trip time threshold. The at least second transmission may then be performed according to the selected two or three diversity modes combined.

In another example embodiment, the second transmission of said data block may comprise transmitting an identical copy of the data block or transmitting a partial copy of the data block. In the latter case, another example embodiment, may be that the data block in the second transmission is encoded in a different manner than the data block in the first transmission. For example, the data block may be encoded in the second transmission in a way that facilitates proper reception and decoding at the second radio node 202.

In further example embodiments, the at least one diversity mode may be selected further based on at least one of:
 capabilities of the second radio node 202,
 a radio environment between the first radio node 200 and the second radio node 202,
 a load in the radio network, and
 statistics related to successful decoding of data blocks previously received at the second radio node 202 using different diversity modes.

By considering one or more of the above factors, the selection of diversity mode(s) can be made more or less optimal and the chances of successful reception and decoding at the second radio node 202 can be increased.

In another example embodiment, the first radio node 200 may further signal information about the selected at least one diversity mode to the second radio node 202 before performing the at least second transmission, as shown in action 304. This embodiment may have the advantage of enabling the second radio node 202 to receive and decode the data block more efficiently and correctly. In that case, another example embodiment, may be that the signalling indicates a duration of using the selected at least one diversity mode for further data blocks.

In another example embodiment, the first radio node 200 may perform at least some of the actions 300-308 autonomously without relying on feedback signalling from the second radio node 202. It has been mentioned above that it is an advantage to omit such feedback signalling e.g. to avoid delays in the communication and avoid added interference in the network. In further example embodiments, at least one of the quality threshold and the round trip time threshold may be set based on requirements in the second radio node 202. Such requirements may depend on how the data will be used in the node 202 which may be determined by an application using the data.

Figure 4:
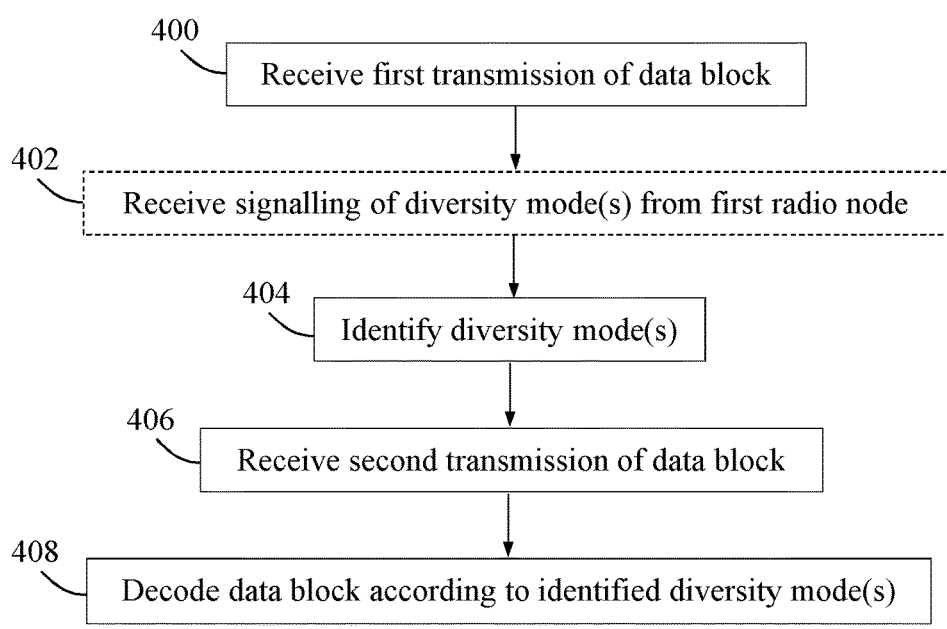
FIG. 4 is a flow chart illustrating a procedure in a second radio node, according to further possible embodiments.

Another example of how the solution may be employed will now be described with reference to the flow chart in FIG. 4 and in terms of actions performed by a second radio node such as the above-described second radio node 202. FIG. 4 thus illustrates a procedure in the second radio node for receiving a data block transmitted by a first radio node in a radio network, such as the above-described first radio node 200. Some optional example embodiments that could be used in this procedure will also be described. Reference will again also be made, without limiting the described features and embodiments, to the example scenario shown in FIG. 2.

A first action 400 illustrates that the second radio node 202 receives a first transmission of the data block from the first radio node 200. This action corresponds to action 306 above. An optional action 402 illustrates that the second radio node 202 may receive signalling that indicates at least one diversity mode from the first radio node 200. This action corresponds to action 304 above. Action 402 may alternatively occur before action 400.

In a next action 404, the second radio node 202 identifies at least one diversity mode, to be used by the first radio node 200, out of the following diversity modes:
1) time diversity mode comprising receiving the data block in multiple time intervals,
2) frequency diversity mode comprising receiving the data block on multiple frequencies, and
3) spatial diversity mode comprising receiving the data block from multiple locations.

Examples of how the second radio node 202 may identify the diversity mode(s) will be presented below. The second radio node 202 further receives at least a second transmission of the data block from the first radio node 200 according to the at least one diversity mode, as shown in a next action 406. This action corresponds to action 308 above. The second radio node 202 further decodes the data block by combining the received first and second transmissions of the data block, as illustrated in a final action 408.

Some non-limiting example embodiments that can be used in the above procedure of FIG. 4, will now be described. In some example embodiments, the at least one diversity mode may be identified in action 404 by any of the following operations:
1) The second radio node 202 may receive signalling that indicates the at least one diversity mode from the first radio node 200, as shown in action 402.
2) The second radio node 202 may perform blind decoding of the second transmission by means of different candidate diversity modes.
3) The second radio node 202 may determine the at least one diversity mode such that an estimated signal quality of the at least one diversity mode is above a quality threshold and/or an estimated round trip time of the at least one diversity mode is below a round trip time threshold. In this alternative, the second radio node 202 may thus estimate the signal quality and/or round trip time for different candidate diversity modes and identify the one(s) that fulfils the thresholds.
4) The second radio node 202 may use past history of which diversity modes have been used for previously transmitted data blocks. Assuming that the diversity mode(s) that has been used most often is the one(s) most likely to be used again by the first radio node 200.
5) The second radio node 202 may determine the at least one diversity mode based on at least one of:
capabilities of the second radio node 202,
a radio environment between the first radio node 200 and the second radio node 202, and
a load in the radio network.
The latter 3 alternatives in operation 5) could be successful if the first radio node 200 has used the same information as a basis for selecting the diversity mode(s) to use, both nodes 200, 202 thus arriving at the same diversity mode(s).

In another example embodiment, a combining scheme may be selected based on the identified at least one diversity mode, to be used when performing action 408. In another example embodiment, receiving the second transmission of said data block as of action 406 may comprise receiving an identical copy of the data block or receiving a partial copy of the data block. In that case, another example embodiment, may be that the data block in the second transmission is decoded in a different manner than the data block in the first transmission. In another example embodiment, signalling received from the first radio node 200 may indicate a duration of using the selected at least one diversity mode for further data blocks.

Advantages that may be achieved when implementing any of the above procedures of FIGS. 3 and 4 and any of the embodiments described herein, include the following. Autonomous selection of retransmission modes, i.e. diversity modes, as described herein makes it possible to find and use a diversity scheme that matches constraints in terms of deployment, latency, bandwidth and transmission resources at the different nodes. For example, when operating at $10^{-9}$ reliability, a fading margin of 90 dB is required. With diversity order 8 this margin is 18 dB, hence some kind of diversity is typically necessary to employ. Relying on feedback is difficult or even impossible as the latency requirement is so tight that the data may become out-of-date after the feedback procedure has been executed. Instead, the solution provides autonomous selection of diversity modes by considering the above-mentioned quality and round trip time thresholds, which enables exploitation or evaluation of several diversity alternatives such that efficient combinations thereof can be selected that match the traffic requirements and current channel conditions.

The embodiments described herein may be implemented according to the above-mentioned three main examples #1-3 which will now be described in more detail.

MAIN EXAMPLE #1

Selecting and Using Basic Retransmission Modes, BRMs

In the first main example, the data is transmitted by the first radio node according to one of the following BRMs1-3 which are thus also referred to as diversity modes:
Temporally diverse retransmissions BRM1, also referred to as time diversity mode.
Frequency diverse retransmissions BRM2, also referred to as frequency diversity mode.
Spatially diverse retransmissions BRM3, also referred to as spatial diversity mode.

Figure 5A:
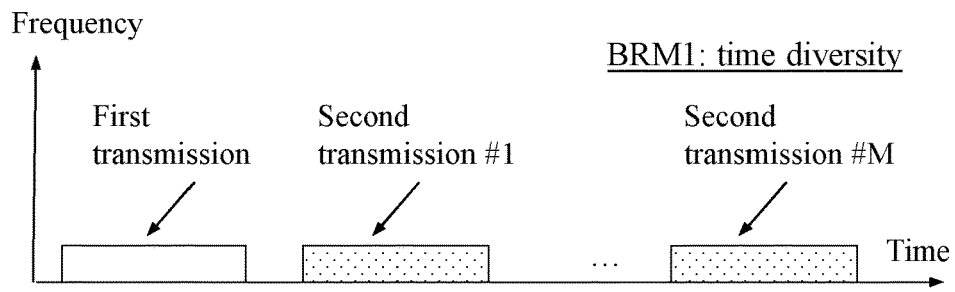
FIGS. 5A-G illustrate some examples of diversity modes and combinations thereof for transmission, according to further possible embodiments.
Figure 5B:
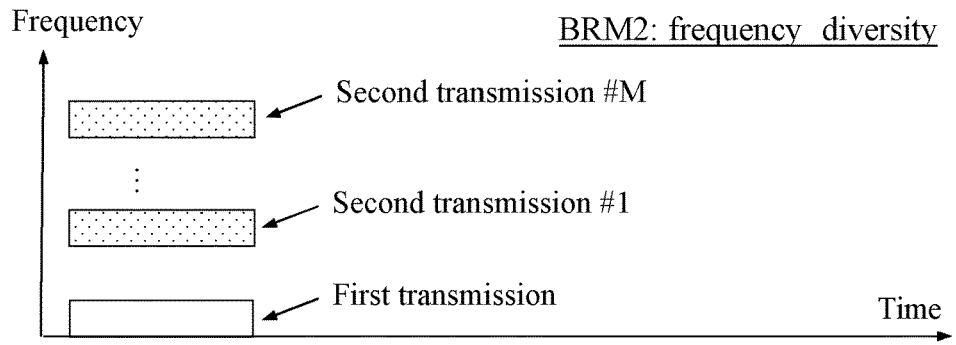
Figure 5C:
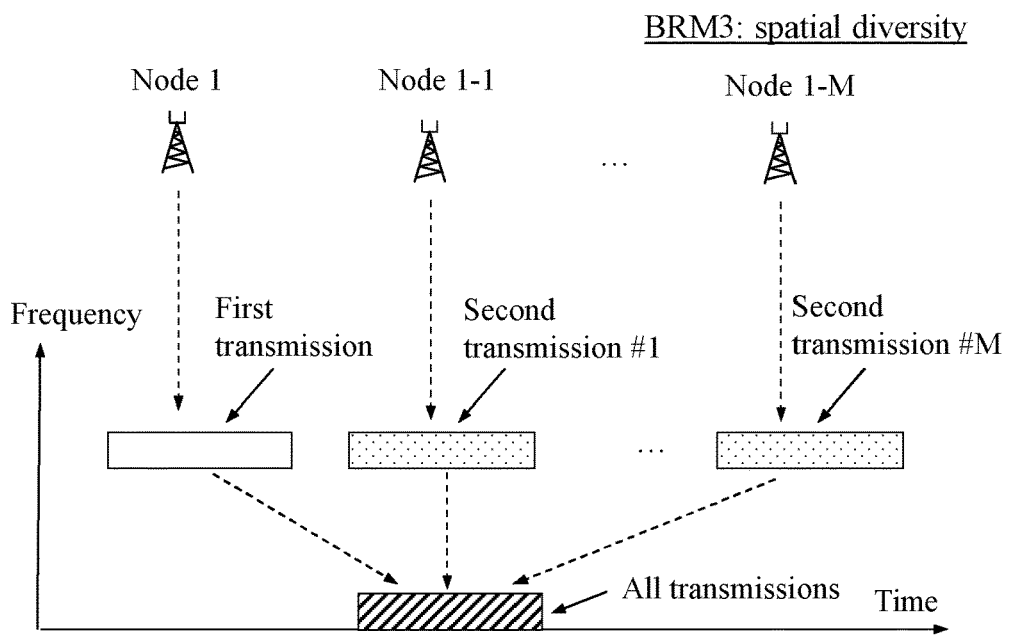

The diversity modes BRM1, BRM2 and BRM3 are illustrated in FIGS. 5A, 5B and 5C, respectively.

In BRM1, as shown in FIG. 5A, the first radio node retransmits one or more copies of the first data block in different time resources occurring after the time resource in which the first data block is transmitted by the first radio node. All the data blocks are transmitted in the same frequency resources e.g. on the same carrier frequency. Examples of time resources are symbol, time slot, subframe, frame etc. For example, the first data block, denoted "First transmission", and the first copy of the first data block, denoted "Second transmission #1", may be transmitted in subframe n and subframe n+m, respectively.

In BRM2, as shown in FIG. 5B, the first radio node transmits the first data block "First transmission" and its copies "Second transmission #1" . . . "Second transmission #M" in the same time resource. However one or more copies of the first data blocks are transmitted in frequency resources which are different than the frequency resources in which the first data block is transmitted by the first radio node. Examples of frequency resources are frequency channel, radio frequency channel, resource element (RE), resource block (RB), physical resource block (PRB), virtual resource block (VRB), group of REs or RBs or PRBs or VRBs, carrier, carrier frequency etc.

In BRM3, as shown in FIG. 5C, the first radio node transmits the first data block "First transmission" and its copies "Second transmission #1" . . . "Second transmission #M" in the same time resource as well as the same frequency resource. However one or more copies of the first data block "Second transmission #1" . . . "Second transmission #M" are transmitted from one or more first sub-radio nodes which are spatially separate from the first radio node which transmits the first data block to the UE. The M set of first sub-radio nodes, which are denoted as Node 1-1 . . . Node 1-M, are associated with the first radio node, which is denoted as Node 1. The association herein means that the first sub-radio nodes Node 1-1 . . . Node 1-M are capable of transmitting copies of the first data block, which in turn is initially transmitted by the first network node Node 1. In one example the first network node Node 1, when transmitting the first data block, also sends its copy to one or more first sub-radio nodes Node 1-1 . . . Node 1-M requesting them to also transmits its copies to the second radio node.

In the above-described FIGS. 5A-C using the diversity modes BRM1, BRM2 and BRM3, respectively, the first radio node thus performs a first transmission of the data block to the second radio node and further performs M second transmissions of the data block to the second radio node where M represents one or more second transmissions of the data block.

Before performing the second transmission of one or more data blocks related to the first transmission, the first radio node 200 thus selects or determines in action 302 at least one of the most suitable basic retransmission modes based on at least one of the above-mentioned first and second comparisons. It was also mentioned above that the first radio node 200 may use further criteria as a basis for selecting the at least one diversity mode. Some examples of how either of BRM1-BRM3 may be selected will now be described in more detail with reference to the following criteria 1-6.

1. Capability of second radio node: A second radio node may or may not be capable of receiving and combining copies of the first data block using all the three basic modes. The second radio node may also have a limited capability in terms of the maximum number of retransmitted data blocks which can be received and combined by the first radio node for each mode e.g. at most 2 data blocks based on each mode. The second radio node may also have a limited capability in terms of portion of the radio spectrum (e.g. carrier frequency, band etc.) over which it can receive the copies of the first data block. The first radio node may obtain information about the capabilities of the second radio node from the second radio node itself, or from another radio node that has this information, or based on some pre-defined information (e.g. manufacturer's specification, etc.). The first radio node may then use the obtained capability information when determining and selecting the most suitable BRM for retransmitting one or more copies of the first data block in the above-described second transmission, as of action 308. For example the first radio node may use the time diversity mode BRM1 of FIG. 5A in case the second radio node is capable of receiving a certain maximum number of the copies of the first data block using BRM1.

2. Target round trip time delay: The first radio node may also select the BRM which would ensure that a certain target Round Trip Time, RTT, for receiving a packet, e.g. the data block, is met at the second radio node. For example, if the target RTT delay is below a first RTT threshold then the first radio node may use the BRM2 or BRM3, which would allow the second radio node to receive the first and the retransmitted data blocks during the same time resource e.g. within the same time slot or subframe.

3. Signal quality target: The first radio node may also select the BRM which would ensure that the signal quality target of the service is met at the second radio node. For example, if the desired signal quality target is below a first quality threshold (e.g. $10^{-7}$% BLER) then the first radio node may use the BRM with which the maximum number of copies of the first data blocks can be transmitted to the second radio node. For example if there are only 1 or 2 first sub-radio nodes (i.e. Node 1-1 and Node 1-2) then the first radio node may select and use BRM1 or BRM2 assuming they can be used for transmitting more than 2 copies of the first data block.

4. Radio environment: The first radio node may also select the BRM based on the radio environment in which the first and the second radio nodes operate. The first radio node may determine the radio environment by observing radio characteristics of radio signals or measuring radio signals received from other radio nodes. The selection of diversity mode(s) based on radio environment is explained in terms of some examples below:

In a first example of selecting BRM, if the radio environment comprises of low delay spread (e.g. flat fading or larger coherence time), then the first radio node may use the spatial diversity mode BRM3 of FIG. 5C. This could be useful because the spatial diverse characteristics associated with BRM3 would induce some level of signal diversity between the first and the subsequent data blocks received at the second radio node.

In a second example of selecting BRM, if the radio environment is associated with a large multipath delay profile (e.g. smaller coherence time) then the first radio node may use the time diversity mode BRM1. This will ensure that the first and the subsequent data blocks transmitted to the second radio node undergo different fading characteristics.

In yet another example of selecting BRM, if the radio environment involves frequency selective fading (e.g. shorter coherence bandwidth), then the first radio node may use the frequency diversity mode BRM2 of FIG. 5B as this would lead to frequency diversity across the data blocks received at the second radio node.

In the above examples, the signal diversity introduced across different data blocks due to the appropriate selection of the BRM will greatly enhance their chances of successful decoding at the second radio node. This in turn will increase reliability of the data reception at the second radio node.

5. Load in the network: The first node may also take into account system load, also referred to as load in the radio network, when determining which diversity mode to use for retransmitting data blocks to different second radio nodes. Examples to quantify or estimate system load include a number of second radio nodes in a cell served by the first radio node, maximum or average bit rate or throughput per cell, maximum or average bit rate or throughput per second radio node etc. For example if the system load is high, e.g. when the total number of second radio nodes is above a threshold, then the first radio node may use each diversity mode with equal probability e.g. to serve one third of the second radio nodes with BRM1, one third of the second radio nodes with BRM2 and the remaining one third of the second radio nodes with BRM3. In this way, the first radio node can utilize all its resources in time, frequency and space. Under high system load, the first radio node may also periodically hop or switch between the BRMs used for different second radio nodes. This will ensure that the data blocks destined to the same second radio nodes experience different kinds of signal diversities over time.

6. Decoding success rate: The first node may also take into account statistics about the success rate of the decoded data blocks at the second radio node with respect to different types of BRMs used for transmitting the data blocks. For example the second radio node may log the statistics of the decoding success and/or failure rates of data blocks for different types of BRMs. The second radio node may transmit the statistics to the first radio node. The first radio node may also implicitly obtain such statistics based on the retransmission rate of higher layer packets or data, e.g. due to decoding failure of the lower layer data blocks. The first radio node may, based on the statistics, choose the BRM which is associated with highest decoding success rate for a particular second radio node.

MAIN EXAMPLE #2

Selecting and Using Composite Retransmission Modes, CRMs

Figure 5D:
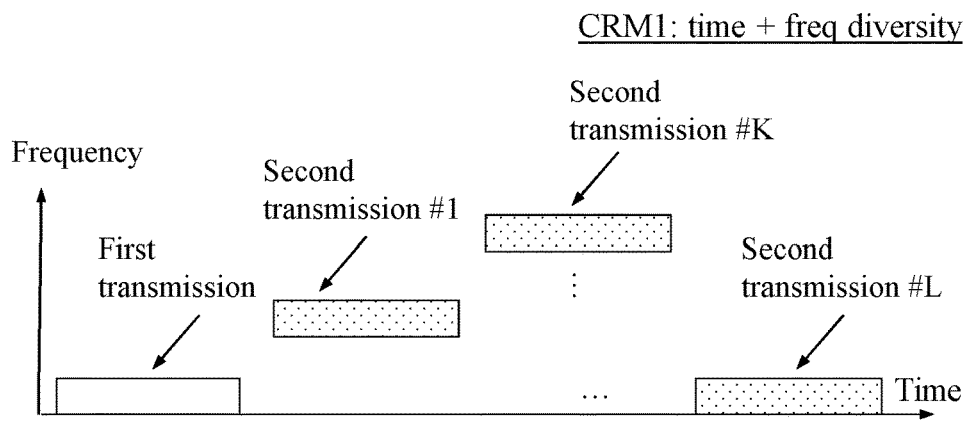

In the second main example, the data blocks are transmitted by the first radio node according to one of the following 4 CRMs:
Time-frequency diverse retransmissions CRM1, also referred to as time+frequency diversity mode.
Temporal-spatial diverse retransmissions CRM2, also referred to as time+spatial diversity mode.
Frequency-spatial diverse retransmissions CRM3, also referred to as frequency+spatial diversity mode.
Frequency-temporal-spatial diverse retransmissions CRM4, also referred to as frequency+time+spatial diversity mode.
The CRM1, CRM2, CRM3 and CRM4 are illustrated in FIGS. 5D, 5E, 5F and 5G, respectively.
The CRM1, as shown in FIG. 5D, is the combination or hybrid of BRM1 and BRM2. In CRM1, the first radio node:
retransmits at least one copy of the first data block in different time resources, "Second transmission #1"-"Second transmission #L", occurring after the time resource in which the first data block is transmitted by the first radio node, and
retransmits at least one copy of the first data block in frequency resources,
"Second transmission #1"-"Second transmission #K", which are different than the frequency resources in which the first data block is transmitted by the first radio node.
Examples of time resources are symbol, time slot, transmission time interval (TTI), interleaving time, sub-frame, frame etc. Examples of frequency resources are frequency channel, subcarrier, radio frequency channel, resource element (RE), resource block (RB), physical resource block (PRB), virtual resource block (VRB), group of REs or RBs or PRBs or VRBs, carrier, carrier frequency etc.

Figure 5E:
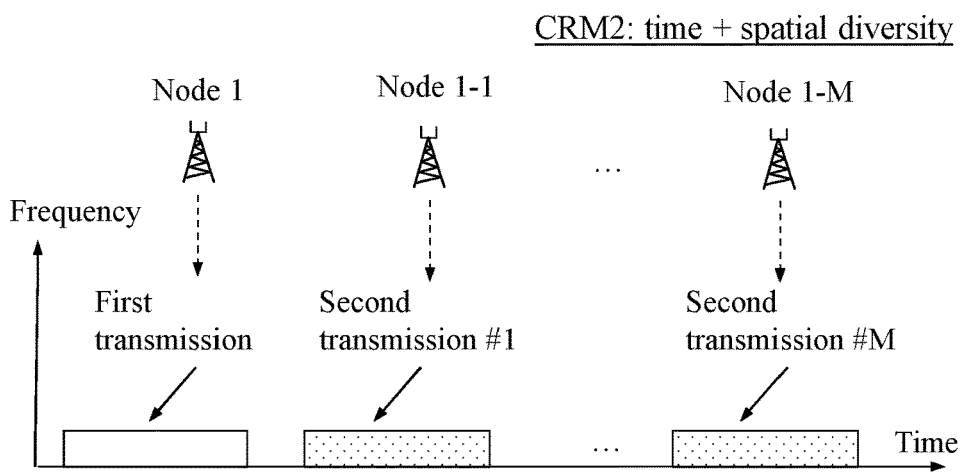

The CRM2, as shown in FIG. 5E, is the combination or hybrid of BRM1 and BRM3. In CRM2, the first radio node:
retransmits at least one copy of the first data block in different time resources occurring after the time resource in which the first data block is transmitted by the first radio node, and
retransmits at least one copy of the first data block from at least one first sub-radio node (Node 1-1 . . . Node 1-M), "Second transmission #1" from Node 1-1" . . . "Second transmission #M" from Node 1-M", which is/are spatially separate from the first radio node (Node 1).

Figure 5F:
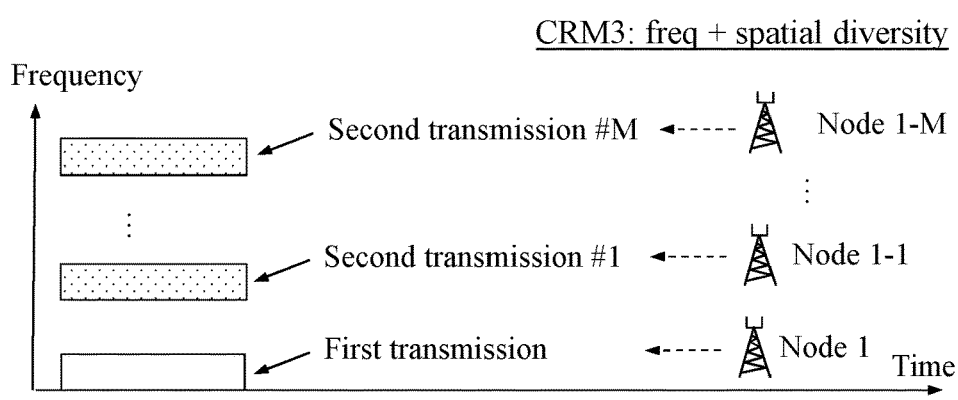

The CRM3, as shown in FIG. 5F, is the combination or hybrid of BRM2 and BRM3. In CRM3, the first radio node:
retransmits at least one copy of the first data block in frequency resources which are different than the frequency resources in which the first data block is transmitted by the first radio node, and
retransmits at least one copy of the first data block from at least one first sub-radio node (Node 1-1 . . . Node 1-M), "Second transmission #1" from Node 1-1" . . . "Second transmission #M" from Node 1-M", which is/are spatially separate from the first radio node (Node 1).

Figure 5G:
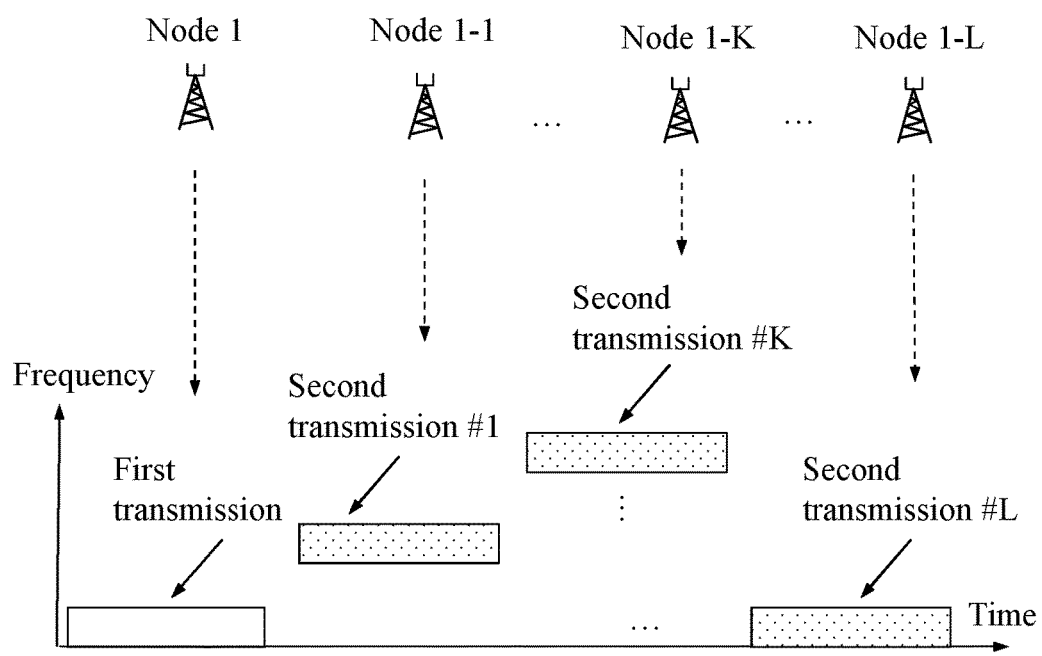

The CRM4, as shown in FIG. 5G, is the combination or hybrid of all the three basic modes BRM1, BRM2 and BRM3. In CRM4, the first radio node:
retransmits at least one copy of the first data block in different time resources, "Second transmission #1"-"Second transmission #L", occurring after the time resource in which the first data block is transmitted by the first radio node;
retransmits at least one copy of the first data block in frequency resources, "Second transmission #1"-"Second transmission #K", which are different than the frequency resources in which the first data block is transmitted by the first radio node and
retransmits at least one copy of the first data block from at least one first sub-radio node (Node 1-1 . . . Node 1K . . . Node 1-L) which is/are spatially separate from, but associated with the first radio node (Node 1).

In the above-described FIGS. 5D-G using the diversity modes CRM1, CRM2, CRM3, and CRM4, respectively, the first radio node thus performs a first transmission of the data block to the second radio node and further performs M, K or L second transmissions of the data block to the second radio node. Before retransmitting one or more data blocks related to the first data block, the first radio node selects or determines the most suitable composite retransmission mode CRM out of the above-described four possible CRM modes CRM1-CRM4 based on at least one of the above-described first and second comparisons. The first radio node 200 may use further criteria as a basis for selecting either of CRM1-CRM4, which will now be described in more detail with reference to the following criteria 1-6, which correspond to the above-described criteria 1-6 used for selecting either of BRM1-BRM3.

1. Capability of second radio node: A second radio node may or may not be capable of receiving and combining copies of the first data block using all the four composite modes. The first radio node may obtain information about the capabilities of the second radio node from the second radio node itself, or from another radio node that has this information, or based on some pre-defined information (e.g. manufacturer's specification etc.). The first radio node may then use the obtained capability information when determining the most suitable CRM mode for retransmitting one or more copies of the first data block. For example, the first radio node may use the frequency+time+spatial diversity mode CRM4 of FIG. 5G in case the second radio node is capable of receiving a certain maximum number of the copies of the first data block using CRM4.

2. Target round trip time delay: The first radio node may also select the CRM which would ensure that a certain RTT delay for receiving a packet is met at the second radio node. For example, if the target RTT delay is below a second RTT threshold then the first radio node may use the frequency+spatial diversity mode CRM3 of FIG. 5F, which would allow the second radio node to receive the first and the retransmitted data blocks during the same time resource e.g. within the same time slot or subframe.

3. Signal quality target: The first radio node may also select the CRM which would ensure that the signal quality target of the service is met at the second radio node. The signal quality target may be expressed in terms of BLER, FER, PER, SNR or SINR, etc. For example, if the desired signal quality target is better than a second quality threshold then the first radio node may select and use the CRM scheme with which the maximum number of copies of the first data block can be transmitted to the second radio node as well as being associated with the maximum possible signal diversity. The signal quality target is considered to be better than a second quality threshold if the signal quality target expressed in data or block error rate (BLER) is below the second quality threshold also expressed in terms of the data or block error rate ($BLER_t$). The signal quality target is also considered to be better than a second quality threshold if the signal quality target expressed in SNR or SINR is higher than the second quality threshold also expressed in terms of SNR or SINR ($SINR_t$). Example of $SINR_t$ is 35 dB. More specifically, if the desired signal quality target expressed in terms of BLER or FER is below a second quality threshold (e.g. $10^{-9}$% BLER), then the first radio node may select and use the CRM scheme with which the maximum number of copies of the first data block can be transmitted to the second radio node as well as which is associated with the maximum possible signal diversity. For example, the first radio node may select and use CRM4 which would allow the transmission of the data blocks using time, frequency and spatial diversities.

4. Radio environment: The first radio node may also select the CRM based on the radio environment in which the first and the second radio nodes operate. The first radio node may determine the radio environment by observing radio characteristics of radio signals or measuring radio signals received from other radio nodes. The selection of CRM based on radio environment is explained in terms of some examples below:

In a first example of selecting CRM, if the radio environment comprises of low delay spread (e.g. flat fading or larger coherence time e.g. a coherence time of 1 μs) and small coherence bandwidth (e.g. 200 KHz) then the first radio node may use CRM3. This could be useful because the spatial diverse characteristics associated with CRM3 would induce some level of signal diversity between the first and the subsequent data blocks received at the second radio node without increasing the round trip time.

In a second example of selecting CRM, if the radio environment is associated with a large multipath delay profile or larger delay spread (e.g. shorter coherence time e.g. coherence time of 0.1 μs) and also a larger coherence bandwidth (e.g. 1 MHz) then the first radio node may use the time+frequency diversity mode CRM1 of FIG. 5D. This will ensure that the first and the subsequent data blocks transmitted to the second radio node undergo different fading characteristics in time and frequency.

In the above examples, the signal diversity introduced across different data blocks due to the appropriate selection of the CRM mode will greatly enhance their chances of successful decoding at the second radio node. This in turn will increase reliability of the data reception at the second radio node.

5. Load in the network: The first node may also take into account system load, i.e. load in the radio network, when determining and selecting which of the four CRM modes to use for retransmitting data blocks to different set of second radio nodes. Examples to quantify or estimate system load include a number of second radio nodes in a cell served by the first radio node, maximum or average bit rate or throughput per cell, maximum or average bit rate or throughput per second radio node, interference experienced by the second radio node, transmit power of signals by the first radio node (e.g. maximum or average transmit power) etc. For example, if the system load is high e.g. when the total number of second radio nodes is above a threshold, then the first radio node may use each diversity mode with equal probability, e.g. in the manner described above for the case of selecting a BRM.

6. Decoding success rate: The first node may also take into account statistics about the success rate of the decoded data blocks at the second radio node with respect to different types of CRM modes used for transmitting the data blocks. The first radio node may, based on the statistics, choose the CRM mode which is associated with highest decoding success rate for a particular second radio node. The decoding success rate may be expressed as a ratio (K) of number of successfully decoded data blocks by the second node to the total number of data blocks transmitted by the first radio node. The parameter K may also be expressed in other terms such as in percentage (e.g. 90%), in logarithmic scale etc.

Furthermore, the first radio node may, after selecting one of the BRM modes or one of the CRM modes, also configure the second radio node with the information about the BRM or CRM mode to be used for transmitting the copies of the first data block, e.g. by signaling the selected diversity mode(s) to the second radio node. However, if the second radio is not configured with the selected BRM or CRM mode, then the second radio node may also autonomously determine the diversity mode(s) as described herein, as an alternative to receiving the signaling from the first radio node.

The mode configuration by the first radio node may be done via signaling on a control channel which may typically be encoded with more robust transport format than that used for transmitting the data blocks. This may be used to ensure that the second radio node is able to successfully receive the control channel and is aware of the selected diversity mode(s) before receiving the subsequent data blocks in the second transmission from the first radio node. The mode selection may typically be done on semi-static basis in that it may be applicable for several time periods e.g. several radio frames. The first radio node may also indicate the time during over which the selected mode is applicable for a particular second radio node. The applicable time duration may also be pre-defined in which case the time duration needs not be configured.

The second radio node may first receive the data block in the first transmission from the first radio node and store it for further processing, e.g. for combining it with one or more subsequent data blocks i.e. copies of the first data block when received in the second transmission. In order to receive the subsequent data blocks, the second radio node may also determine the diversity mode(s) with which said subsequent data blocks are transmitted by the first radio node.

The second radio node may determine the diversity mode(s) by performing one or more of the following operations:

1. Explicit determination: Based on the configuration or indication received in signaling from the first radio node as described above.
2. Implicit determination: This may be realized by one or more of the following:
   In one example, the second radio node may blindly determine the diversity mode(s), e.g. one of BRM1-3 or CRM1-4, used for transmitting the copies of the first data block. For example, the second radio node may attempt to decode the expected data blocks sent in different time resources, frequency resources and by different possible first sub-radio nodes.
   In another example, the second radio node may determine the diversity mode(s) used for transmitting the copies of the first data, based on one or more criteria which were described above, i.e. the same criteria used by the first radio node for selecting the diversity mode(s).
   In yet another example, the second radio node may determine the diversity mode(s) used for transmitting the copies of the first data, based on the historical data or past history about the modes used for transmitting the copies of the first data block.

After determining the diversity mode(s) and receiving the first data block and its copies, the second radio node may use a suitable combining scheme for combining the data blocks to ensure that the data blocks are successfully decoded. The successfully decoded data blocks are then provided to its higher layers for further processing.

The first radio node may also be capable of using any of the modes in both sets of modes: the basic retransmission modes and the composite retransmission modes. It will now be described how the first radio node may decide whether to use one of the BRM or one of the CRM modes.

MAIN EXAMPLE #3

Deciding Between BRM and CRM

In the third main example, the first radio node may, based on one or more criteria, decide whether to select and use one of the BRM or the CRM modes for transmitting copies of the first data block to the second radio node in the second transmission. The selection of the mode set (BRM or CRM) may also be specific to the second radio node, e.g. only BRM modes may be used for one set of second radio nodes while only CRM modes may be used for another set of second radio nodes.

After selecting one the two sets of modes, the first radio node may also inform the second radio node about the set of modes to be used for transmission of the first data block. This will enable the second radio node to prepare itself for receiving data blocks using one of the modes belonging to the selected set of modes.

Examples of criteria to be used by the first radio node for deciding whether to use BRM or CRM modes are capability of second radio node in terms of supporting BRM and/or CRM modes, signal quality target, system load etc. For example if the signal quality target of the service is very stringent (e.g. below a second target threshold) then the first radio node uses only one of the 4 CRM modes for retransmission of the first data block to the second radio node. Under high system load the first radio node may decide to use ones of the CRM modes to ensure more second radio nodes can be served.

Figure 6:
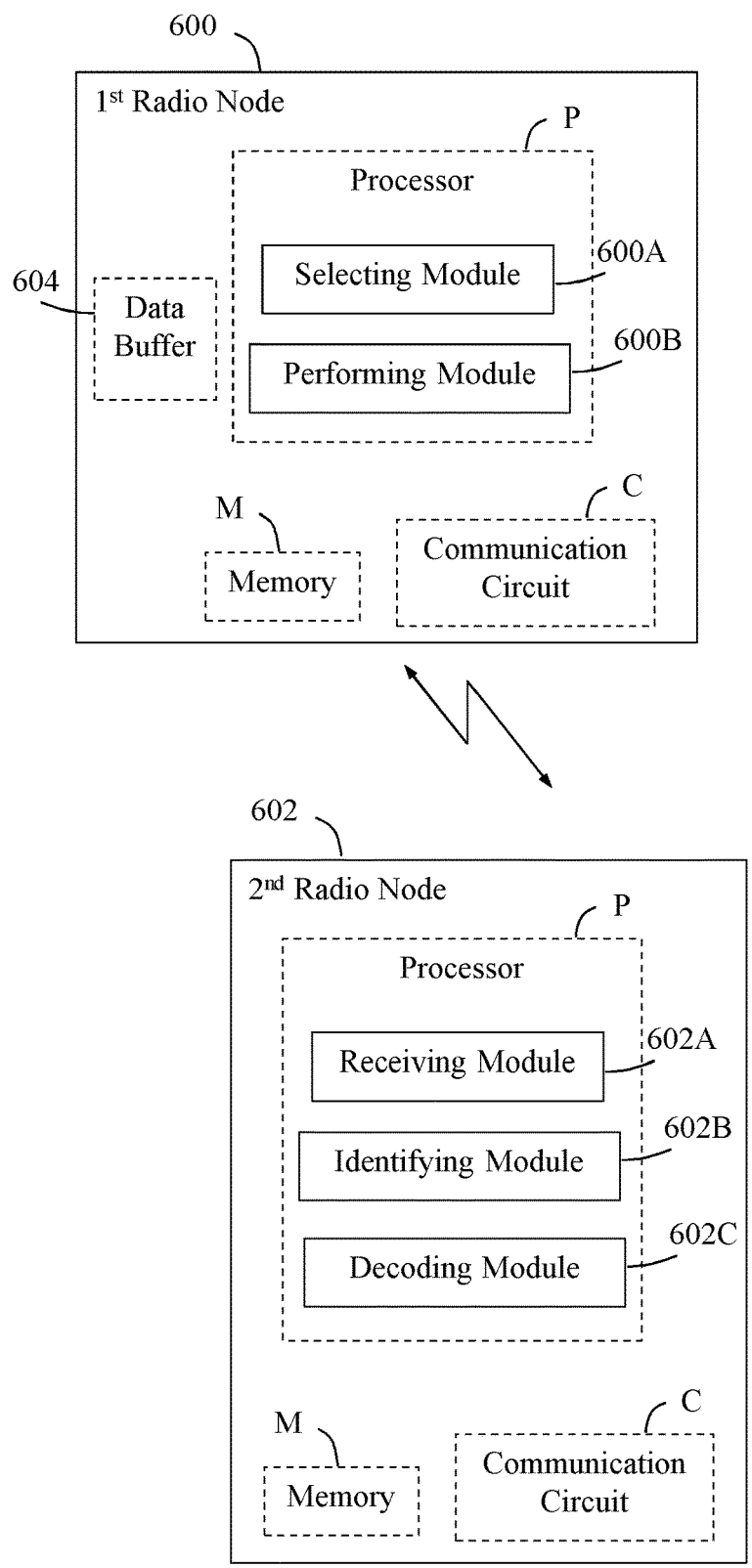
FIG. 6 is a block diagram illustrating a first radio node and a second radio node in more detail, according to further possible embodiments.

The block diagram in FIG. 6 illustrates a detailed but non-limiting example of how a first radio node 600 and a second radio node 602, respectively, may be structured to bring about the above-described solution and embodiments thereof. In this figure, the first radio node 600 and the second radio node 602 may be configured to operate according to any of the examples and embodiments of employing the solution as described herein, where appropriate. Each of the first radio node 600 and the second radio node 602 is shown to comprise a processor "P", a memory "M" and a communication circuit "C" with suitable equipment for transmitting and receiving radio signals in the manner described herein.

The communication circuit C in each of the first radio node 600 and the second radio node 602 thus comprises equipment configured for communication with each other using a suitable protocol for the communication depending on the implementation. The solution is however not limited to any specific types of radio signals or protocols.

The first radio node 600 is, e.g. by means of modules, units or the like, configured or arranged to perform at least some of the actions of the flow chart in FIG. 3 as follows. Further, the second radio node 602 is, e.g. by means of modules, units or the like, configured or arranged to perform at least some of the actions of the flow chart in FIG. 4 as follows.

The first radio node 600 is arranged to transmit a data block to the second radio node 602 in a radio network. The first radio node 600 may be configured to first obtain the data block, e.g. from a data buffer 604 or the like in the node 600, to be transmitted to the second radio node 602, as described above for action 300. The first radio node 600 is configured to select at least one diversity mode out of:

1) time diversity mode comprising transmitting the data block in multiple time intervals,
2) frequency diversity mode comprising transmitting the data block on multiple frequencies, and
3) spatial diversity mode comprising transmitting the data block from multiple locations, based on at least one of a first comparison between an estimated signal quality of each diversity mode and a quality threshold, and a second comparison between an estimated round trip time of each diversity mode and a round trip time threshold. This operation may be performed by a selecting module 600A in the first radio node 600 as described above for action 302. The first radio node 600 may be further configured to signal the selected at least one diversity mode to the second radio node 602, as described above for action 304.

The first radio node 600 is further configured to perform a first transmission of the data block to the second radio node. This operation may be performed by a performing module 600B in the first radio node 600 as described above for action 306. The first radio node 600 is further configured to perform at least a second transmission of said data block to the second radio node 602 according to the selected at least one diversity mode. This operation may be performed by the performing module 600B as described above for action 308. The performing module 600B could alternatively be named a transmitting module.

The second radio node 602 is arranged to receive a data block transmitted by a first radio node 600 in a radio network. The second radio node 602 is configured to receive a first transmission of the data block from the first radio node 600. This operation may be performed by a receiving module 602A in the second radio node 602, as described above for action 400. The second radio node 602 is further configured to identify at least one diversity mode, to be used by the first radio node 600, out of:
  1) time diversity mode comprising receiving the data block in multiple time intervals,
  2) frequency diversity mode comprising receiving the data block on multiple frequencies, and
  3) spatial diversity mode comprising receiving the data block from multiple locations.

This operation may be performed by an identifying module 602B in the second radio node 602 as described above for action 404. The second radio node 602 is further configured to receive at least a second transmission of said data block from the first radio node 600 according to the at least one diversity mode. This operation may be performed by the receiving module 602A as described above for action 406. The second radio node 602 is further configured to decode the data block by combining the received first and second transmissions of the data block. This operation may be performed by a decoding module 602C as described above for action 408.

It should be noted that FIG. 6 illustrates various functional modules in the first radio node 600 and the second radio node 602, respectively, and the skilled person is able to implement these functional modules in practice using suitable software and hardware equipment. Thus, the solution is generally not limited to the shown structures of the first radio node 600 and the second radio node 602, and the functional modules therein may be configured to operate according to any of the features, examples and embodiments described in this disclosure, where appropriate.

The functional modules 600A-B and 602A-C described above may be implemented in the first radio node 600 and the second radio node 602, respectively, by means of program modules of a respective computer program comprising code means which, when run by the processor P causes the first radio node 600 and the second radio node 602 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the first radio node 600 and the second radio node 602 in the form of a memory having a computer readable medium and being connected to the processor P. The computer program product or memory M in each of the first radio node 600 and the second radio node 602 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective first radio node 600 and second radio node 602.

The solution described herein may be implemented in each of the first radio node 600 and the second radio node 602 by a computer program comprising instructions which, when executed on at least one processor, cause the at least one processor to carry out the actions according to any of the above embodiments and examples, where appropriate. The solution may also be implemented at each of the first radio node 600 and the second radio node 602 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "radio node", "data block", "diversity mode", "signal quality" and "round trip time" have been used throughout this disclosure, although any other corresponding entities, functions, and/or parameters could also be used having the features and characteristics described here. The solution is defined by the appended claims.

The invention claimed is:

1. A method, performed by a first radio node, for transmitting a data block to a second radio node in a radio network, the method comprising the first radio node:
  selecting at least one diversity mode out of:
    1) time diversity mode comprising transmitting the data block in multiple time intervals;
    2) frequency diversity mode comprising transmitting the data block on multiple frequencies, and
    3) spatial diversity mode comprising transmitting the data block from multiple locations;
  wherein the selecting is based on at least one of:
    a first comparison between an estimated signal quality of each diversity mode and a quality threshold; and
    a second comparison between an estimated round trip time of each diversity mode and a round trip time threshold;
  performing a first transmission of the data block to the second radio node; and
  performing at least a second transmission of the data block to the second radio node according to the selected at least one diversity mode.

2. The method of claim 1, wherein the selecting is performed such that:
  the estimated signal quality of the selected at least one diversity mode is above the quality threshold; and/or
  the estimated round trip time of the selected at least one diversity mode is below the round trip time threshold.

3. The method of claim 1:
wherein the selecting comprises selecting two or three diversity modes such that the estimated signal quality of the selected two or three diversity modes combined is above the quality threshold and/or the estimated round trip time of the selected two or three diversity modes combined is below the round trip time threshold; and
wherein the at least second transmission is performed according to the selected two or three diversity modes combined.

4. The method of claim 1, wherein the second transmission of the data block comprises transmitting an identical copy of the data block or transmitting a partial copy of the data block.

5. The method of claim 4, wherein the data block in the second transmission is encoded in a different manner than the data block in the first transmission.

6. The method of claim 1, wherein the selecting is further based on at least one of:
capabilities of the second radio node;
a radio environment between the first radio node and the second radio node;
a load in the radio network; and
statistics related to successful decoding of data blocks previously received at the second radio node using different diversity modes.

7. The method of claim 1, further comprising signaling information about the selected at least one diversity mode to the second radio node before performing the second transmission.

8. The method of claim 7, wherein the signaling indicates a duration of using the selected at least one diversity mode for further data blocks.

9. The method of claim 1, wherein the method is performed autonomously without relying on feedback signaling from the second radio node.

10. The method of claim 1, wherein at least one of the quality threshold and the round trip time threshold is set based on requirements in the second radio node.

11. A first radio node arranged to transmit a data block to a second radio node in a radio network, the first radio node comprising:
processing circuitry;
memory containing instructions executable by the processing circuitry whereby the first radio node is operative to:
select at least one diversity mode out of:
1) time diversity mode comprising transmitting the data block in multiple time intervals;
2) frequency diversity mode comprising transmitting the data block on multiple frequencies, and
3) spatial diversity mode comprising transmitting the data block from multiple locations;
wherein the selecting is based on at least one of:
a first comparison between an estimated signal quality of each diversity mode and a quality threshold; and
a second comparison between an estimated round trip time of each diversity mode and a round trip time threshold;
perform a first transmission of the data block to the second radio node; and
perform at least a second transmission of the data block to the second radio node according to the selected at least one diversity mode.

12. The first radio node of claim 11, wherein the instructions are such that the first radio node is operative to select the at least one diversity mode such that:
the estimated signal quality of the selected at least one diversity mode is above the quality threshold; and/or
the estimated round trip time of the selected at least one diversity mode is below the round trip time threshold.

13. The first radio node of claim 11, wherein the instructions are such that the first radio node is operative to:
select the at least one diversity mode by selecting two or three diversity modes such that the estimated signal quality of the selected two or three diversity modes combined is above the quality threshold and/or the estimated round trip time of the selected two or three diversity modes combined is below the round trip time threshold; and
perform the at least second transmission according to the selected two or three diversity modes combined.

14. The first radio node of claim 11, wherein the instructions are such that the first radio node is operative to select the at least one diversity mode further based on at least one of:
capabilities of the second radio node;
a radio environment between the first radio node and the second radio node;
a load in the radio network; and
statistics related to successful decoding of data blocks previously received at the second radio node using different diversity modes.

15. The first radio node of claim 11, wherein the instructions are such that the first radio node is operative to signal information about the selected at least one diversity mode to the second radio node before performing the second transmission.

16. The first radio node claim 11, wherein the instructions are such that the first radio node is operative to operate autonomously without relying on feedback signaling from the second radio node.

17. A method, performed by a second radio node, for receiving a data block transmitted by a first radio node in a radio network, the method comprising the second radio node:
receiving a first transmission of the data block from the first radio node;
identifying at least one diversity mode, to be used by the first radio node, out of:
1) time diversity mode comprising receiving the data block in multiple time intervals;
2) frequency diversity mode comprising receiving the data block on multiple frequencies; and
3) spatial diversity mode comprising receiving the data block from multiple locations;
receiving at least a second transmission of the data block from the first radio node according to the at least one diversity mode;
decoding the data block by combining the received first and second transmissions of the data block; and
wherein the at least one diversity mode is identified by any of:
blind decoding of the second transmission by means of different candidate diversity modes;
an estimated round trip time of the at least one diversity mode is below a round trip time threshold; and
past history of which diversity modes have been used for previously transmitted data blocks.

18. A second radio node arranged to receive a data block transmitted by a first radio node in a radio network, the second radio node comprising:
  processing circuitry;
  memory containing instructions executable by the processing circuitry whereby the second radio node is operative to:
    receive a first transmission of the data block from the first radio node;
    identify at least one diversity mode, to be used by the first radio node, out of:
      1) time diversity mode comprising receiving the data block in multiple time intervals;
      2) frequency diversity mode comprising receiving the data block on multiple frequencies; and
      3) spatial diversity mode comprising receiving the data block from multiple locations;
    receive at least a second transmission of the data block from the first radio node according to the at least one diversity mode; and
  decode the data block by combining the received first and second transmissions of the data block; and
  wherein the at least one diversity mode is identified by any of:
    blind decoding of the second transmission by means of different candidate diversity modes;
    an estimated round trip time of the at least one diversity mode is below a round trip time threshold; and
    past history of which diversity modes have been used for previously transmitted data blocks.

* * * * *